United States Patent

[11] 3,578,187

[72] Inventor Jean Charles Stribick
7, Cours, Hippolyte Saiezea, Saint-Etienne, Loire, France
[21] Appl. No. 808,451
[22] Filed Mar. 19, 1968
[45] Patented May 11, 1971
[32] Priority Mar. 21, 1968
[33] France
[31] 68143

[54] INSTALLATION FOR THE PREFABRICATION OF CONSTRUCTION ELEMENTS
4 Claims, 6 Drawing Figs.
[52] U.S. Cl. ..................................................... 214/89, 198/19
[51] Int. Cl. ....................................................... B23g 5/22
[50] Field of Search ........................................... 214/89; 198/19; 104/127—131; 25/(Inquired)

[56] References Cited
UNITED STATES PATENTS
2,728,466 12/1955 Postlewaite et al. .......... (214/89)
2,987,201 6/1961 Abbey .......................... 214/89
3,294,260 12/1966 Frangos ....................... 214/16.1(4E)
3,384,939 5/1968 Baker ........................... 198/19X Primary Examiner—Albert J. Makay
Attorney—Waters, Roditi, Schwartz & Nissen ABSTRACT: An installation for the prefabrication of construction elements is provided with translating elements such as rails forming in a base plane various conveyor lines for pallets carrying elements and molds for the elements. At operating stations along the conveyor lines is a lifting device for raising the pallets to upper operating stations and lowering them. The lifting device has a shoe for each corner of a pallet. The shoe is fixed to a nut screwed on a vertical screw which is rotated by a horizontal shaft and bevel gears, driven by a central motor. Operations of long duration can thereby be performed at upper stations while pallets not requiring such operations can continue to circulate along the conveyor lines. The installation can be automated through a central control desk.

Patented May 11, 1971 3,578,187

Patented May 11, 1971

INSTALLATION FOR THE PREFABRICATION OF CONSTRUCTION ELEMENTS

The present invention relates to installations for the prefabrication of construction elements.

In the field of building construction, use is made more and more generally of prefabricated elements, namely, panels of interior partitions and facing panels, whether or not equipped with windows, and French windows or other openings, whether or not comprising outer or inner coatings and of which the fabrication requires very diverse operations.

For the prefabrication of these elements, recourse is had mostly to installations called "fixed molds." The molds are fixed to the ground; and each mold enables the complete prefabrication of a panel, that is to say the realization of various operations connected with the fabrication of this panel. The fixed condition of the molds with the necessity of carrying out at the same site all the operations of fabrication, leads to having to displace the working equipment from one mold to the other, makes impossible the specialization of manpower such as form-makers; pavers; iron fitters, etc. and requires complex mechanization of the fabrication, since it is necessary that each mold be equipped with all the mechanisms necessary for the various operations, namely: means for vibrating, smoothing, frying, tilting, etc. Such installations involve, in addition, supply difficulties, since the same materials must be provided at each site of a mold; the numerous manipulations which result therefrom hence contribute to further compound the cost of the elements.

There exist, to be sure, installations in which the molds are placed on pallets which are shiftable over the ground. The "continuous" or "production line" manufacture thus realized eliminates to a large extent the drawbacks of fixed mold installations; but the production rate is seriously hampered by elements whose fabrication takes longer. If, in fact, the fabrication of elements of concrete is considered, the times of intervention vary considerably from one mold to the other thus between a floor slab and a facing panel, the difference of the operating times can be 2 hours. The fabrication of complex elements hence slows the output rate of the production line considerably, and this becomes a function of the duration of the operation on the molds for the fabrication of the most complex elements.

To overcome this situation, it has indeed been thought to produce installations comprising several parallel lines. However, there are then again encountered drawbacks which have been indicated above for "fixed mold" installations, especially the difficulty of supplying these installations.

Independently of installations called "fixed mold" installations, and of "production line" installations, there indeed exist certain installations in which prefabrication is done "in batteries." In these installations, the elements are cast in groups of vertical banks. Such installations lend themselves well to the prefabrication of very simple elements such as panels of interval walls; but there can be not question of adopting them for the fabrication of complex elements, such as facing panels, so that such installations "in batteries" must be completed by "fixed mold" installations, or by "production line" installations, with the drawbacks that are connected therewith and which have been discussed above.

There hence exists in practice no installation enabling the fabrication of elements of very different types without the fabrication of the most complex elements slowing that of all the elements, including the simplest ones.

It is an object of the invention to provide such an installation.

According to the invention there is provided an installation of the "production line" type, of which the mold bearing pallets are capable, not only of a movement of translation on the one or more production lines common to all the pallets, but also and at will, of a lifting movement above that of one or more lines to reach an upper working level in which may be carried out the operations, in the course of which the panel-bearing pallets which do not require these operations, or for which these operations have been finished at a station located upstream, circulate on one or more lines below one or more raised pallets.

With this object, the installation according to the invention comprises, on both sides of the conveyor line of the pallets, lifting members capable of making these pallets pass from their lower position of translation on the conveyor line, to an upper position where certain operations are effected.

This lifting of the pallets can, of course, by realized in various ways. Thus, according to one embodiment of the invention, there is provided in proximity to each of the four corners of each working station, a shoe rigidly attached to a nut screwed on a vertical screw which, at its lower part, is connected by a conical gearing to a horizontal shaft receiving its rotary movement from a central motor.

The invention will be well understood, and its advantages as well as other characteristics will emerge from the description which follows of one embodiment of an installation according to the invention, purely by way of illustrative but nonlimiting example and with reference to the accompanying diagrammatic drawing in which.

Figure 1:
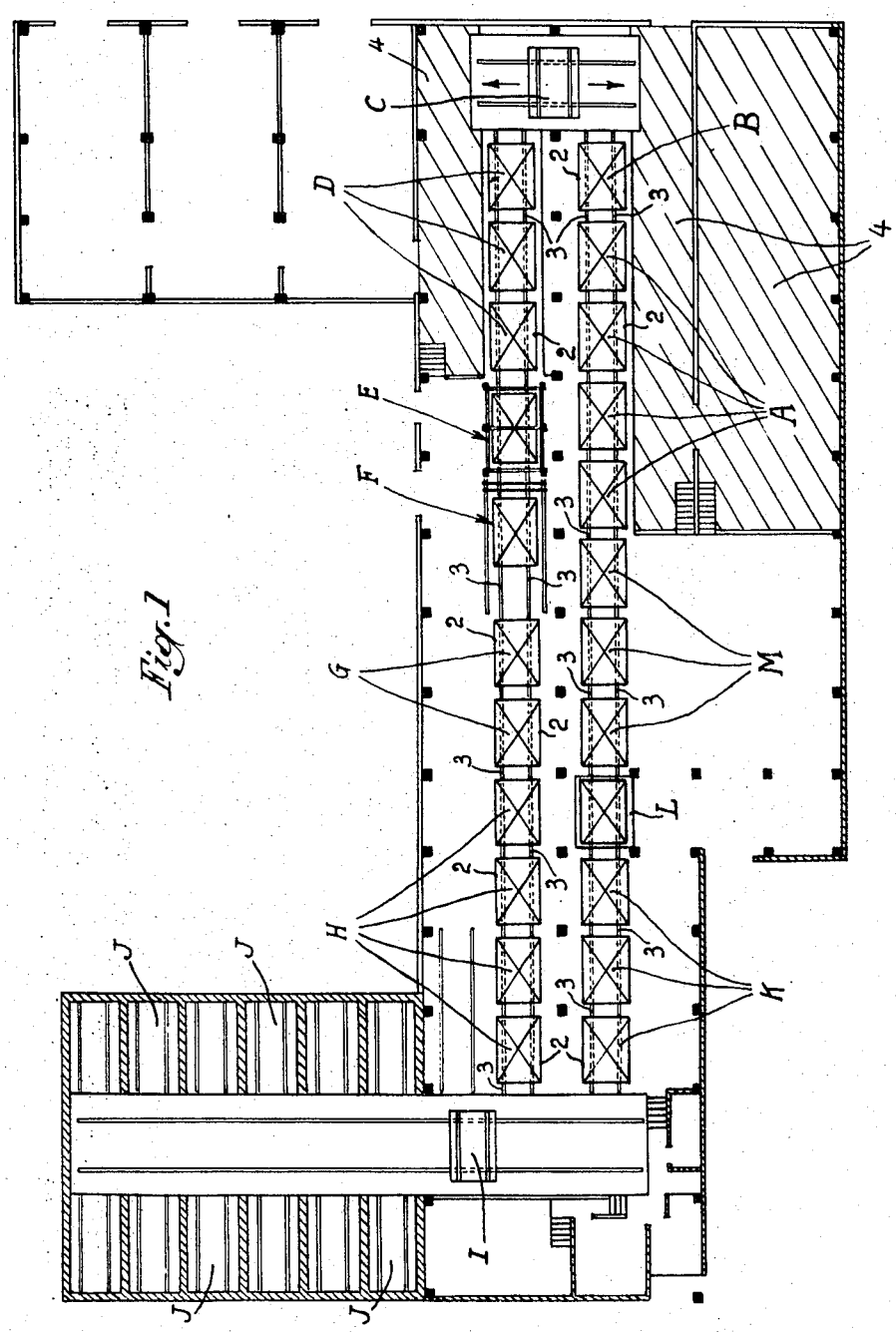
FIG. 1 is a general view of this embodiment in plan from above.
Figure 2:
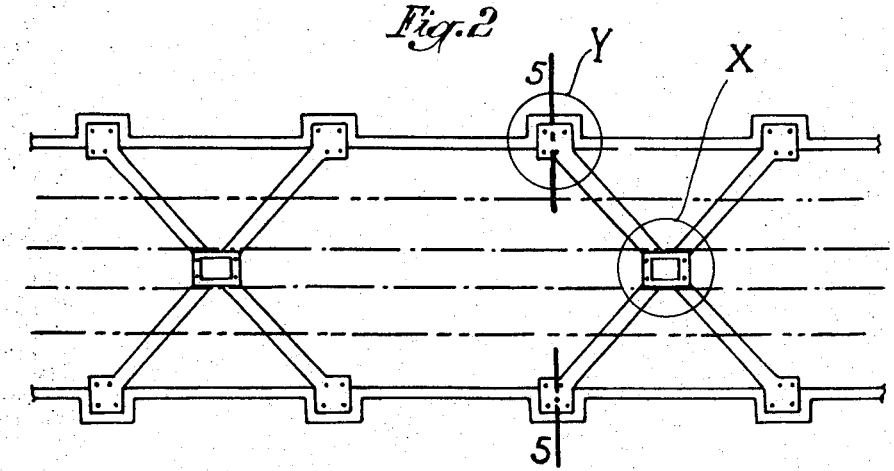
FIG. 2 shows, from above, two working stations arranged according to the invention.

The installation shown in FIG. 1 enables the prefabrication of very diverse construction elements, from the simple floor panel to complex facing panels, including panels for interior partitions.

The fabrication of all these elements is effected on pallets identical among themselves and on which are arranged molds enabling the fabrication of the elements. These pallets designated by 2 consist of carriages shiftable on rails 3 by means of chains or of cables not shown in the drawing; and, in the course of their displacement, the pallets 2 traverse the various stations for fabrication of the panels.

These stations can be of any number. In the particular case shown by way of example in FIG. 1, A denotes four form-making stations, B one paving station, C denotes a transfer bridge carrying pallets from the last station B to the first of the three stations D in which is effected the iron-fitting of the panels; E is a concreting station, F is a vibrating station, G two waiting stations, H four smoothing stations; I denotes a transfer bridge enabling the pallets with their panels to be brought successively from the last smoothing station H to one or the other of the ovens J and, later, to remove the pallets, from these ovens up to the form-stripping stations denoted by K. L denotes the station for tipping the finished panel; and M denotes three pallet cleaning stations.

Among these various stations, those where the operations can be of variable duration are those of form-making A, of paving B and of iron-fitting D. For these stations, there is provided, according to the invention, a working floor 4 located at an upper level from that of the pallet transfer plane, that is to say from that of the rails 3 on which the pallets 2 are shifted; and there is provided, always according to the invention, means enabling at will the pallets 2 to be elevated so that they leave their rails 3 and reach the working plane 4, in the aforesaid zones A, B and D.

To this end, at the center of each station A, B and D, there is disposed a motor with a vertical shaft 5 driving through a crown 6 four gear wheels 7 mounted at the ends of four shafts 8 arranged at about 90° with respect to one another. At its other end, each shaft 8 bears a conical pinion 9 meshing with another pinion 10 keyed on a vertical screw 12 pivoting in the bearings 13. On this screw 12 is screwed a sleeve or nut 14 to which is rigidly attached an arm 15 terminating at a shoe 16.

Figure 5:
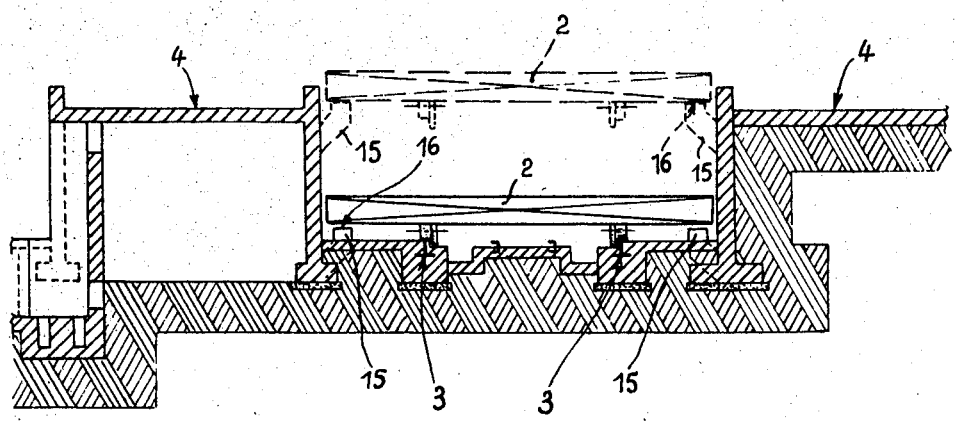
FIG. 5 is a view in section along the line 5—5 of FIG. 2.
Figure 4:
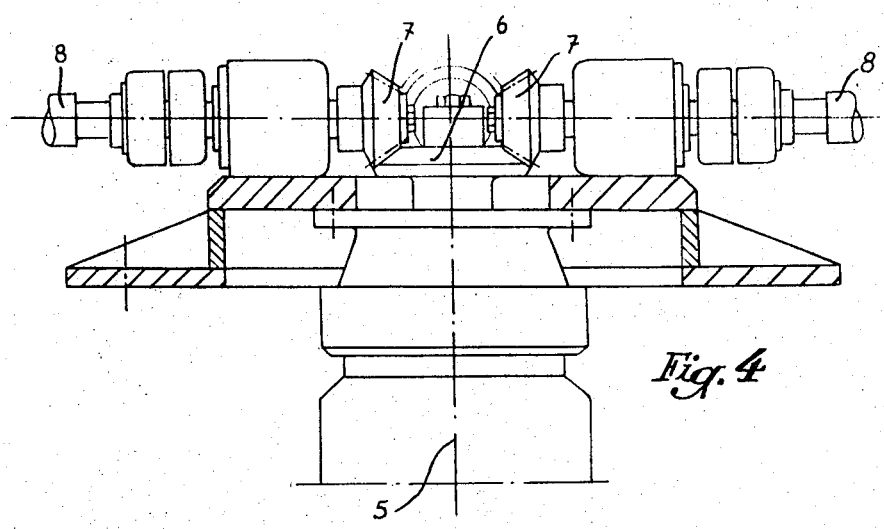
FIG. 4 is a view in partial section along the line 4—4 of FIG. 3.
Figure 3:
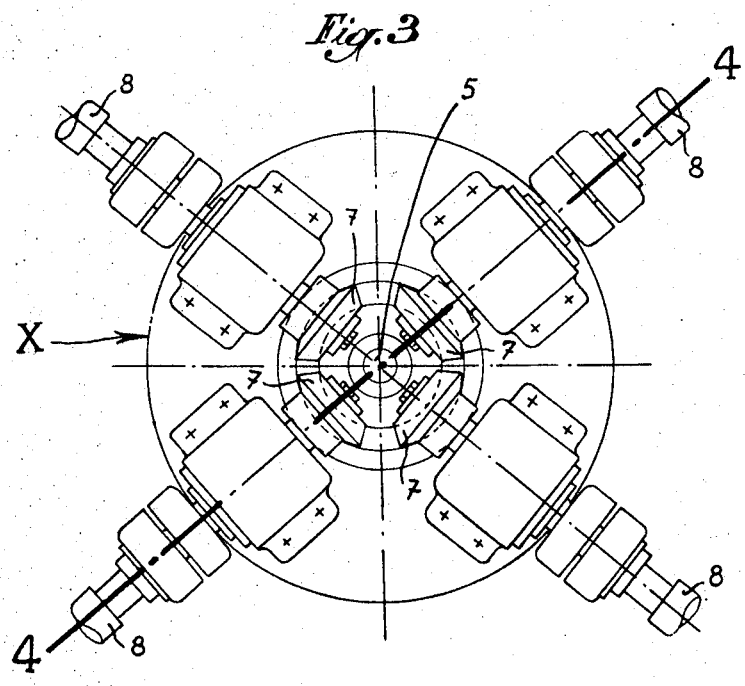
FIG. 3 is a plan view of the central part denoted by X in FIG. 2.
Figure 6:
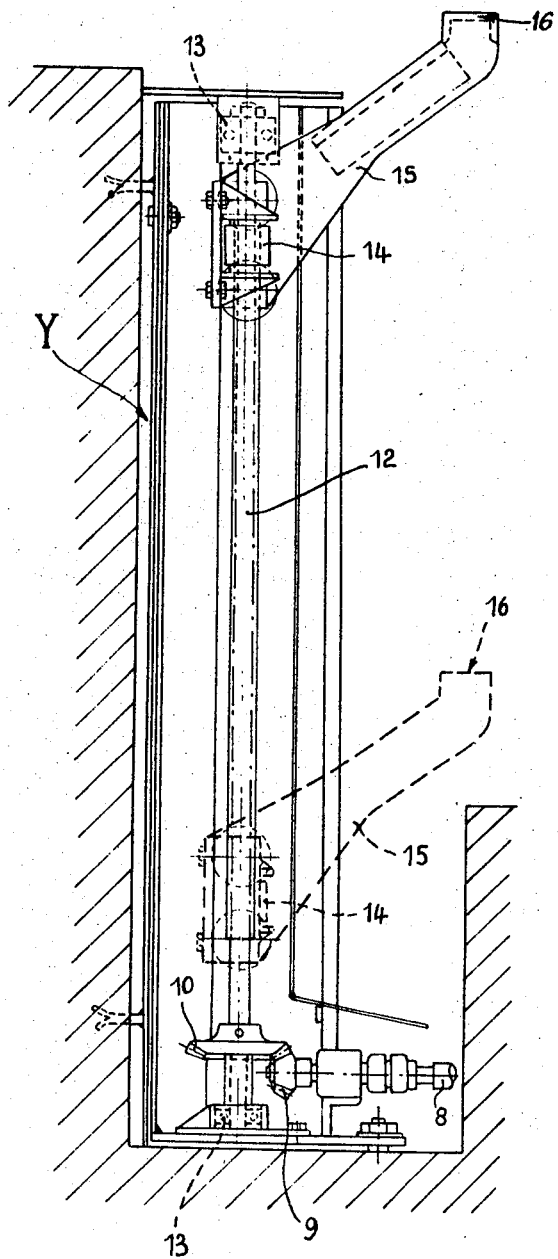
FIG. 6 is a view in elevation of the zone designated by Y in FIG. 2.

With each of the stations A, B and D are thus associated four shoes 16 of which the arrangement is such that they are situated appreciably below the four corners of a pallet 2. It is hence understood that to cause this pallet to pass from its lower position of translation on the rails 3 to its upper position in which it is aligned with the working level 4, it suffices to put the central electric motor 5 into operation so that the four vertical screws 12 turn causing the nuts 14 to rise and hence the shoes 16, from which the elevating of the pallets 2 results (FIG. 5).

When a pallet 2 has thus been raised in one of the positions A, B, D, it does not interfere with the displacement of other pallets which can circulate freely below it on the rails 3; and when operations which have to be carried out on the pallet in high position are finished, the electric motor 5 is put into operation in reverse direction to enable the pallet 2 to redescend onto the rails 3 and to resume the normal cycle of fabrication.

As goes without saying, the invention is not limited to the single embodiment of this installation for the prefabrication of building elements which has been indicated above by way of example; it embraces, on the contrary, all variations thereof, whatever may be the means used for automating the operation of the installation; thus, especially, the automation of the entire operation of translation and of lifting the pallets to the corresponding stations can be controlled, from a single central control desk on which a general diagram of the installation displays by luminous marks the occupation of the stations and the transfers in progress, the transfers from station to station being controlled automatically through the central desk by information of the end of each operation reaching it from each of these stations.

I claim:

1. Apparatus for operating on an article, said apparatus comprising a plurality of operating stations successively spaced from one another at a first level, transport means for carrying said article successively from one operating station to the next at said first level, said transport means including a rail and a plurality of carriages slidable along said rail, each of said carriages including four corner portions and being adapted for carrying a respective article along said rail successively to each of said operating stations, at least one of said operating stations having an operating time of greater duration than that of the other of said operating stations and including a second level above said first level to which said article is raised to be operated on, and lifting means for elevating said transport means from said first level to said second level and for lowering said transport means from said second level to said first level upon the completion of the operation at said second level, said lifting means including four vertically movable arms engageable with said four corner portions respectively for lifting said carriages to said second level.

2. Apparatus as claimed in claim 1, including a plurality of said rails, and means for transferring said carriages from one rail to the next.

3. Apparatus as claimed in claim 1 wherein said lifting means further includes a motor disposed centrally between each of said arms, and gear means interconnecting said motor and said arms for elevating said arms simultaneously.

4. Apparatus as claimed in claim 3, wherein said gear means includes four vertical screw members, means interconnecting said screw members with said motor for rotating said screw members simultaneously, and four threaded sleeves rotatably associated respectively with each of said vertical screw members, and connected to each of said arms respectively for elevating said arms as said screw members are rotated.